J. H. MOSEL.
BATCH BOX.
APPLICATION FILED MAY 12, 1920.
1,408,383.
Patented Feb. 28, 1922.
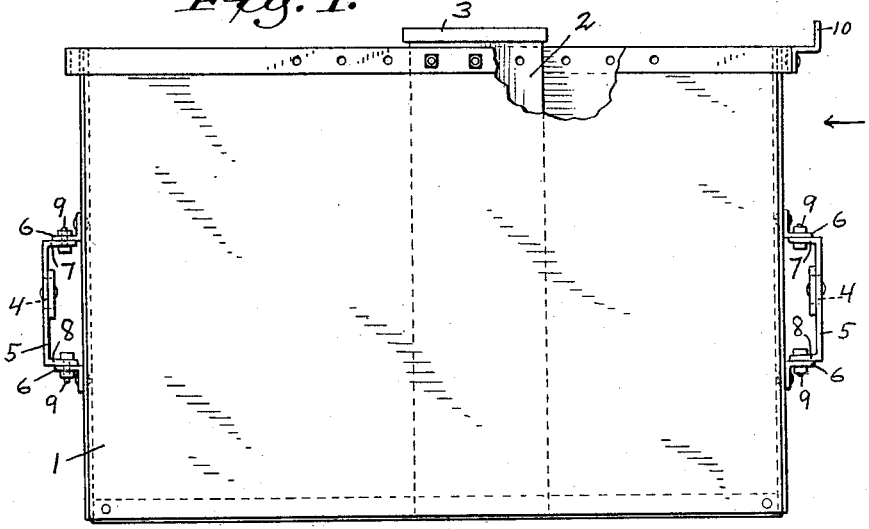
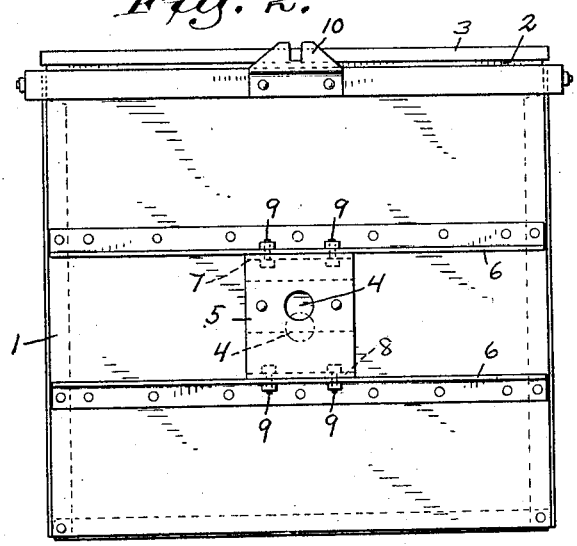
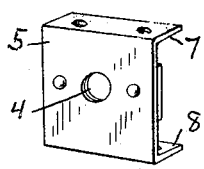
Inventor
Joseph H. Mosel,
By Bottum, Bottum, Hudnall & Lecher,
Attorneys.

UNITED STATES PATENT OFFICE.

JOSEPH H. MOSEL, OF LAKEWOOD, OHIO, ASSIGNOR TO THE LAKEWOOD ENGINEERING COMPANY, OF CLEVELAND, OHIO, A CORPORATION OF OHIO.

BATCH BOX.

1,408,383.  Specification of Letters Patent.  Patented Feb. 28, 1922.

Application filed May 12, 1920. Serial No. 380,784.

*To all whom it may concern:*

Be it known that I, JOSEPH H. MOSEL, a citizen of the United States, residing at Lakewood, in the county of Cuyahoga and State of Ohio, have invented certain new and useful Improvements in Batch Boxes, of which the following is a specification, reference being had to the accompanying drawing, forming a part thereof.

This invention relates to batch boxes for handling the materials for concrete and similar purposes and the object of the invention is to improve the construction of such batch boxes in the manner to be hereinafter described and claimed.

Referring to the drawings which accompany this specification and form a part hereof, which drawings illustrate an embodiment of this invention and on which drawings the same reference characters are used to designate the same parts wherever they may appear in each of the several views, Fig. 1 is a side elevation of a batch box, a part of the side of the box being broken away; Fig. 2 is an elevation of an end of the box looking in the direction of the arrow on Fig. 1; and Fig. 3 is a perspective view of a detail of construction.

Referring to the drawings, the reference numeral 1 designates a receptacle of box-like construction with closed bottom, sides and ends, but having its top open. This receptacle may be constructed in any suitable manner and in any preferred form. The reference numeral 2 designates a cement container, when the batch box is used for charges of stone, sand and cement for concrete, and the cement container is illustrated by the drawings as a box-like structure having a closed bottom, sides and ends and an open top. The reference numeral 3 designates a cover for the cement container 2 and the cover 3 is preferably bodily removable from the cement container, though the specific construction in this respect is not material to this invention. The cement container is adapted to form a partition in the receptacle 1 and can be adjusted to different positions in the receptacle 1 to properly proportion the relative quantities of sand and crushed stone, for example, to be used in a particular "mix" of concrete. In handling the materials for concrete, the batch box is intended to contain the proper relative quantities of sand, crushed stone, and cement for the consistency of the concrete required and, referring to Fig. 1 of the drawings, the sand will be placed in the receptacle at the right hand of the cement container, the crushed stone will be placed in the receptacle at the left hand of the cement container, and the cement will be placed in the cement container.

The principle of construction of the batch box illustrated and described is that the sand and stone compartments will be filled full so that separate measuring of the sand and stone is dispensed with. The batch box is intended to be handled by a bail with reference to which it can tip to discharge its contents and the centers of rotation of the batch box are properly placed. Contractors and cement workers are, however, using standard batch boxes for handling different quantities of materials from the quantities for which the batch boxes were designed with the result that a change of the center of gravity of a batch box and contents to a lower position requires more effort to tip or dump the box with a corresponding increase in the length of time required for the tipping or dumping operation. In concrete work nowadays speed of operation is an indispensible factor in the successful use of apparatus and human exertion consumes time and is adapt to prove to be a nuisance. I save time and obviate the nuisance element by providing the batch box with variable centers of rotation so that the centers of rotation to be used will correspond approximately, at least, with the theoretical positions for all variations or ranges in the proportions of materials and the quantities of materials which a single batch box is adapted to handle.

The variable centers of rotation may be provided in any suitable or preferred manner but I have illustrated and shall describe a very simple, durable and efficient construction for the purpose. The variable centers of rotation are illustrated by the drawings as apertures 4 to receive trunnions, not shown, which are carried by a bail, not shown. Pieces of channel iron 5 are provided with the apertures 4 and are illustrated as secured to stiffening angle irons 6 which extend across the ends of the batch box. The apertures 4 in the pieces of channel iron 5 are located nearer the flanges 7 than the flanges 8 so that by connecting the flanges 7 with the upper angle irons 6 the centers of rotation of the batch box will be higher than when the flanges 7 are connected with the lower angle irons 6, as will be readily understood from an inspection of Fig. 2 of the drawings.

By simply removing the bolts 9, capsizing the channel irons 5, and replacing the bolts 9, the variable centers of rotation are changed from one position to another vertically.

The reference numeral 10 designates a catch adapted to be engaged by a latch on the bail, not shown, to prevent the batch box from being unintentionally turned to a dumping position.

What I claim is:

1. The combination with a batch box, of a member provided with a center of rotation for the batch box, and means for securing said member to the batch box with the center of rotation in different positions.

2. The combination with a batch box of variable centers of rotation connected therewith, comprising channel irons with apertures therein located nearer one flange of the channel irons than the other flange thereof.

3. The combination with a batch box of variable centers of rotation comprising members having apertures therein and adapted to support the batch box with the apertures located in different positions with respect to the batch box.

In witness whereof I hereto affix my signature.

JOSEPH H. MOSEL.